US006150025A

United States Patent [19]

Roe et al.

[11] Patent Number: 6,150,025

[45] Date of Patent: Nov. 21, 2000

[54] POLYURETHANE ROLLER WITH HIGH SURFACE RESISTANCE

[75] Inventors: Ronald Lloyd Roe, Lexington, Ky.; Edward Wayne Weidert, Superior, Colo.

[73] Assignee: Lexmark International, Inc., Lexington, Ky.

[21] Appl. No.: 09/352,503

[22] Filed: Jul. 12, 1999

[51] Int. Cl.$^7$ .................................................... B32B 27/40

[52] U.S. Cl. .................................... 428/423.1; 428/36.91; 428/425.8; 430/110; 492/56; 492/59

[58] Field of Search ................................ 428/423.1, 36.9, 428/36.91, 425.8; 430/110; 492/56, 59

[56] References Cited

U.S. PATENT DOCUMENTS

| | | | |
|---|---|---|---|
| 5,248,560 | 9/1993 | Baker et al. | 428/425.8 |
| 5,434,653 | 7/1995 | Takizawa et al. | 355/259 |
| 5,496,496 | 3/1996 | Kajita et al. | 252/182.24 |
| 5,707,743 | 1/1998 | Janes et al. | 428/423.1 |
| 5,874,172 | 2/1999 | Beach et al. | 428/423.1 |

*Primary Examiner*—D. S. Nakarani
*Assistant Examiner*—Christopher Paulraj
*Attorney, Agent, or Firm*—John A. Brady

[57] ABSTRACT

A roller for electrophotography is made from a mixture of polyurethane, polydiene, polyether diol, a first conductive filler and a second conductive filler which catalyzes oxidation of the polydiene. The first conductive filler comprises hexahalogenated acetylacetonates. The roller has a very high outer surface electrical resistance from baking the roller to oxidize the polybutadiene. The charge roller is achieved at low production cost and functions well with charging by a DC potential and AC overlay.

23 Claims, No Drawings

POLYURETHANE ROLLER WITH HIGH SURFACE RESISTANCE

FIELD OF THE INVENTION

The present invention is directed to rollers used in electrophotography. More particularly, the invention is directed to electrically conductive rollers having a surface with a high electrical resistivity and particularly suitable as a charge roller.

BACKGROUND OF THE INVENTION

A functional roller for use in electrophotographic printing often requires an outer surface layer of high electrical resistivity over a core of controlled electrical conductivity. U.S. Pat. No. 5,707,743, which is incorporated in its entirety herein by reference, describes such a roller having an outer surface layer of high electrical resistivity and a core of controlled conductivity, and a process for manufacture. Polybutadiene is incorporated in the materials of the core and the core is then baked to oxidize the polybutadiene at the surface of the core, resulting in a resistive surface on the core.

The embodiments of the foregoing U.S. Pat. No. 5,707,743 were directed to developer roller applications. A developer roller contacts a photoconductive surface and delivers toner to the photoconductive surface.

U.S. patent application Ser. No. 09/124,695 filed Jul. 9, 1998, U.S. Pat. No. 6,042,946 discloses the incorporation of carbon black and/or antimony-doped tin oxide in a roller such as that described in U.S. Pat. No. 5,707,743 to lower the core resistance and allow the roller to be used as a charge roller. A charge roller contacts a photoconductive member and is imparted with a high voltage, which thereby transfers an electrical potential to the photoconductive member. This voltage to the charge roller is typically an AC voltage overlaid onto a DC voltage, the peak AC voltage being at least twice the DC voltage is considered optimum for operation. This is a function which may be achieved by a corona discharge device and other known techniques, but contact charging, as with the charge roller, has a special advantage of creating minimal collateral discharges which can degrade the environment. U.S. patent application Ser. No. 09/124,695 is herein incorporated in its entirety by reference. The incorporation of carbon black and/or antimony-doped tin oxide requires blending of solid materials into the prepolymer bulk, resulting in a mixture having an elevated viscosity as high as 10,000 cP at room temperature. This high viscosity requires elevation of the temperature to reduce the viscosity of the prepolymer mixture in order to effectively move the material. In addition, utilizing solid materials requires intimate mixing to disperse the materials to the desired level. This additional mixing creates the possibility of bubbles within the mixture, in turn requiring a longer degassing time prior to delivery into the mold. Accordingly, charge rollers with increased ease of manufacturing and more homogeneous incorporation of conductive additives into the bulk materials are desired.

SUMMARY OF THE INVENTION

Accordingly, it is an object of the present invention to provide novel rollers for use in electrophotography which overcome one or more disadvantages of the prior art. It is a further object to provide rollers which are suitable for use as charge rollers in electrophotography. It is a more specific object of the present invention to provide charge rollers with increased ease of manufacturing and more homogeneous incorporation of conductive fillers into the bulk materials from which the charge rollers are formed.

These and additional objects and advantages are provided by the rollers according to the present invention in which the rollers incorporate a conductive filler comprising hexahalogenated acetylacetonates in the core material to lower the resistivity of the core to desired values.

In one embodiment, the present invention is directed to an endless electrophotographic member comprising a body of polyurethane, polydiene, a first conductive filler and a second filler which catalyzes the oxidation of said polydiene. The electrophotographic member has an outer surface of oxidized polydiene. The first conductive filler comprises hexahalogenated acetylacetonates.

The roller of this invention may be a cast or otherwise molded, electrically conductive polymeric roller with a surface layer of high electrical resistivity. This roller mimics the electrical properties of a coated roller. The roller is composed of polydiene, such as polyisoprene or more specifically polybutadiene, with a polyurethane prepolymer, a trifunctional polyether polyol, a conductive filler such as ferric chloride which is both a conductive additive and a catalyst, a second conductive filler, and a polyether diol. The bulk resistivity of the roller is low relative to typical urethane values. The surface of the cured roller is oxidized to produce a surface layer of material with high electrical resistivity. The surface of this oxidized roller is very resistive. The cost of production is low compared to adding one or more separate outer layers. Charge rollers of this invention charge well in low temperatures and low humidity environments when a DC potential with an AC overlay is applied to them as their voltage sources, which corresponds to the functioning of a resistively coated charge roller. Single resistivity charge rollers generally perform well in low temperature and low humidity environments only when a DC-only voltage is applied.

Another embodiment of the present invention is directed to an endless electrophotographic member comprising a body of polymerized product of polyisocyanate and polyether polyol, a polydiene, a first conductive filler and a second conductive filler which catalyzes the oxidation of the polydiene. The electrophotographic member has an outer surface of oxidized polydiene. The first conductive filler comprises hexahalogenated acetylacetonates.

These and additional objects and advantages will be further apparent in view of the following detailed description.

DETAILED DESCRIPTION

In a preferred embodiment, the charge roller comprises a body of polycaprolactone ester toluene polyurethane, polydiene, a first conductive filler and a second conductive filler which catalyzes the oxidation of the polydiene. The charge roller has an outer surface of oxidized polydiene. The first conductive filler is selected from the group consisting of cesium hexafluoroacetylacetonate, calcium hexafluoroacetylacetonate, cobalt hexafluoroacetylacetonate and ferric hexafluoroacetylacetonate. Preferably, the first conductive filler comprises cesium hexafluoroacetylacetonate. In another preferred embodiment, the second conductive filler comprises ferric chloride. In yet another preferred embodiment, the polydiene comprises polybutadiene.

In another embodiment of the present invention, the charge roller comprises a body of polymerized product of polycaprolactone ester toluene-diisocyanate and polyether polyol, a polydiene, a first conductive filler and a second conductive filler which catalyzes the oxidation of the polydiene. The charge roller has an outer surface of oxidized polydiene. The first conductive filler is selected from the group consisting of cesium hexafluoroacetylacetonate, calcium hexafluoroacetylacetonate, cobalt hexafluoroacetylacetonate and ferric hexafluoroacetylacetonate. Preferably, the first conductive filler comprises the cesium hexafluoroacetylacetonate. In another preferred embodiment, the second conductive filler comprises ferric chloride. Preferably, the polydiene comprises polybutadiene. In a preferred embodiment, the polyether polyol comprises polyether triol and polyether diol.

Using the combination of materials described in the specification, a cast, or otherwise molded urethane roller having a resistive surface layer is produced by baking in air at an elevated temperature. The oxidation of polybutadiene, in the presence of ferric chloride, produces a highly resistive layer at the surface, while a linear difunctional polyol, as well as the addition of conductive fillers, in addition to ferric chloride, provide desired hardness and conductivity to the body of the roller.

Polycaprolactone urethane prepolymer, such as Vibrathane 6060 (trademarked product of Uniroyal Chemical) is the urethane employed because of its stable electrical resistivity with temperature and humidity changes. Vibrathane 6060 is a polycaprolactone ester toluene-diisocyanate prepolymer. The combination of polycaprolactone urethane, polyether triol, polyether diol, ferric chloride and cesium hexafluoroacetylacetonate produces a roller with a single low resistivity from the roll surface to the center. In order to produce a roller with a high resistivity surface layer, a polydiene such as polybutadiene must be included in the formulation.

Polybutadiene can be added in either prepolymer or diol form. The polycaprolactone urethane can be cured by using a combination of polyether diol with a polyether triol curative, such as Simusol TOIE, a product of Seppic, Inc. The polyether diol acts as a polymer chain extender for the urethane, as does Poly-G 55-37 (trademarked product of Olin Corp.), a high molecular weight polyether diol (number average molecular weight 3,000). The Poly-G 55-37 softens the resulting material as the relative amount in the mixture is increased.

The use of a hydrolytic stabilizer is required to maintain the roller's physical and electrical properties over a long period of time and at various environmental conditions. The addition of triisopropanolamine (TIPA) (trademark of Dow Chemical Company) acts to hydrolytically stabilize the described urethane-based developer roll. In addition, 2-6-di-tert-butyl-p-cresol (Naugard BHT; trademarked product of Uniroyal Chemical) or other antioxidant materials should be added to the materials to control oxidated aging. Typical amounts will vary; however, 3,000 ppm polybutadiene has been shown to be effective for this purpose.

The urethane formulation is cast into a mold around a central, metal shaft and then cured at approximately 93° C. for up to one hour using a combination of curing in a mold and out of a mold to produce a rubber roller. The roller is then ground to the correct dimension. The roller does not yet have a resistive layer on the surface. The resistive layer is produced by baking the ground roller in air at an elevated temperature for some length of time. This baking procedure oxidizes the polybutadiene. The polybutadiene is preferably highly saturated (60% trans 1,4; 20% cis 1,4; and 20% 1,2-vinyl structure) which makes it very susceptible to oxidation. The presence of ferric chloride is necessary to catalyze the oxidation processes. Alternative ionic salts which catalyze this oxidative processes are ferrous chloride, calcium chloride and cobalt hexafluoroacetylacetonate.

The oxidation of polybutadiene in the presence of ferric chloride produces a highly resistive surface layer. The thickness and electrical resistivity of this surface layer can be controlled by varying the concentration of ferric chloride, the concentration of polybutadiene, the baking temperature, the concentration of oxygen and the baking time. For a roller to be used as a charge roller, these parameters preferably are altered to optimize the characteristics of the roller for the specific applied voltage.

The following example demonstrates an embodiment and advantages of a charge roller according to the present invention. In this example and throughout the present specification, parts and percentages are by weight unless otherwise indicated.

EXAMPLE

In this example, a charge roller according to the present invention was prepared. The formulation of the charge roller is listed in Table 1.

TABLE 1

| Component | Parts | Weight (g) | Weight % |
|---|---|---|---|
| Polycaprolactone urethane prepolymer (Vibrathane 6060)* | 100.00 | 59.56 | 59.56% |
| Polyether triol (Simusol TOIE)** | 2.77 | 1.65 | 1.65% |
| Polybutadiene (R-45HT-BHT Resin)*** | 15.11 | 9.00 | 9.00% |
| Polyether diol (Poly-G 55-37)**** | 48.96 | 29.16 | 29.16% |
| Cesium Hexafluoroacetylacetonate | 0.42 | 0.25 | 0.25% |
| Ferric Chloride, anhydrous | 0.550 | 0.328 | 0.328% |
| TIPA***** | 0.10 | 0.06 | 0.06% |
| Total | 167.91 | 100.00 | 100.00% |

*% NCO V6060 = 3.40
**OH number of TOIE = 618.0
--Equivalent wt (g/eq) = 90.788
***OH value of polybutadiene R-45HT-BHT Resin = 0.83
--Equivalent wt (g/eq) = 1204.819
****OH value of Poly-G 55.37 = 37.00
--Equivalent wt (g/eq) – 1516.405
*****TIP Equivalent wt (g/eq) = 63.7

The charge roller was processed as described below:

1) Preheat at 75° C. the Vibrathane 6060, Polybutadiene R-45HT-BHT, Poly-G 55-37 and TIPA.
2) Preheat a roller mold at 93° C. (200° F.). The mold may require application of a mold release compound to aid in demolding.
3) Mix the solution of $FeCl_3$ and Simusol TOIE (polyol) with low heat and stirring.
4) Degas the Vibrathane 6060 thoroughly, degas the polyol/$FeCl_3$ mixture and the Polybutadiene R-45HT-BHT.
5) Add a shaft to the mold and preheat at 93° C. for approximately 10 minutes.
6) Carefully mix as follows:
   a) Combine and mix the Vibrathane 6060, Polybutadiene R-45HT-BHT, Poly-G 55-37 and Cesium Hexafluoroacetylacetonate.
   b) Add the polyol/$FeCl_3$ mixture and TIPA.
   c) Continue to mix and then fill the mold.

Note: Mixing is done by using a pneumatic mixer with care to avoid aerating materials during mixing to minimize bubble formation.

7) Cure at 93° C.

8) Check the curing after 15-20 minutes and demold when hardness is reasonably firm to the touch.

9) Postcure at 93° C. for 9 hours to oxidize the outer surface of the roller.

Stoichiometry=0.95

(Note: by practice the isocyanate functional group is considered 1; accordingly this stoichiometry defines 100 isocyanate to 95 hydroxyl)

Batch size (g)=100.00

TOIE Equivalents ratio=0.40

Polybutadiene R-4511T-BHT Equivalents ratio=0.16

TIPA Equivalents ratio=0.02

Poly-G 55-37 Equivalents ratio=0.42

The equivalent fraction is the ratio of one ingredient to the total of a functional group supplied. Since the last four materials in Table I supply all of the hydroxyl groups, their equivalent fractions total 1. Variations in weight percent based on the various raw material lots are anticipated and marginal adjustments are made as is known to those skilled in the art of polyurethane formulating. Stoichiometry is 95 hydroxyl functional groups per 100 isocyanate functional groups to assure adequate completion of the chemical reaction.

This formula provides core bulk resistivity of $1\times10^6$ to $1\times10^9$ ohm-cm (measured at −100 V/DC).

The rollers may be characterized by a variety of electrical techniques. A roller is typically cleaned with isopropyl alcohol and painted with conductive carbon or silver paint in a 10 mm strip down the roller. The roller is then placed in a test fixture which applies a force of 2.0–2.4 kg uniformly along the entire length of the roller. The AC resistivity of the roller at 100 V is measured both pre and post oxidation cure to insure that the proper oxidation thickness has been obtained. Typical desired values for the bulk resistivity of the charge roller core will range from $1\times10^6$ to $1\times10^9$ ohm-cm with the oxidized coating resistivity ranging from $2\times10^7$ to $1\times10^{12}$ ohm-cm depending on the specific application of the roller (all such measurements being at −100 V DC). The oxidized coating resistivity can be increased for a specific application with an increase in out-of-mold cure time resulting in an increase of oxidized coating thickness, and overall resistivity of the finished charge roller.

The foregoing description of the various embodiments of the invention has been presented for thc purposes of illustration and description. It is not intended to be exhaustive or to limit the invention to the precise form disclosed. Many alternatives, modifications, and variations will be apparent to those skilled in the art of the above teaching. Accordingly, this invention is intended to embrace all alternatives, modifications, and variations that have been discussed herein, and others that fall within the spirit and broad scope of the claims.

We claim:

1. An endless electrophotographic member comprising a body formed from a mixture of polyurethane, polydiene, a first electrically conductive filler and a second electrically conductive filler, said second conductive filler catalyzing oxidation of said polydiene, said member having an outer surface of oxidized polydiene, wherein the first conductive filler is selected from the group consisting of cesium, hexafluoroacetylacetonate, calcium hexafluoroacetylacetonate, and ferric hexafluoroacetylacetonate and the second conductive filler is selected from the group consisting of ferric chloride, ferrous chloride, calcium chloride, and cobalt hexafluoroacetylacetonate.

2. The electrophotographic member of claim 1, wherein the polyurethane comprises polycaprolactone ester toluene polyurethane.

3. The electrophotographic member of claim 2, wherein the polydiene comprises polybutadiene.

4. The electrophotographic member of claim 1, wherein the polydiene comprises polybutadiene.

5. The electrophotographic member of claim 1, wherein the second conductive filler is ferric chloride.

6. The electrophotographic member of claim 1, wherein the second conductive filler is cobalt hexafluoroacetylacetonate.

7. The electrophotographic member of claim 1, wherein the first conductive filler is cesium hexafluoroacetylacetonate.

8. The electrophotographic member of claim 1, wherein the second conductive filler is cobalt hexafluoroacetylacetonate and the first conductive filler is cesium cobalt hexafluoroacetylacetonate.

9. The electrophotographic member of claim 8, wherein the polydiene comprises polybutadiene.

10. An endless electrophotographic member comprising a body of polymerized product of polyisocyanate and polyether polyol, polydiene, a first electrically conductive filler and a second electrically conductive filler, said second conductive filler catalyzing oxidation of the polydiene, said member having an outer surface of oxidized polydiene, wherein the first conductive filler is selected from the group consisting of cesium, hexafluoroacetylacetonate, calcium hexafluoroacetylacetonate, and ferric hexafluoroacetylacetonate and the second conductive filler is selected from the group consisting of ferric chloride, ferrous chloride, calcium chloride, and cobalt hexafluoroacetylacetonate.

11. The electrophotographic member of claim 10, wherein the first conductive filler is cesium hexafluoroacetylacetonate.

12. The electrophotographic member of claim 11, wherein the polyisocyanate comprises polycaprolactone ester toluene-diisocyanate.

13. The electrophotographic member of claim 11, wherein the polydiene comprises polybutadiene.

14. The electrophotographic member of claim 11, wherein the polyether polyol comprises polyether triol and polyether diol.

15. The electrophotographic member of claim 10, wherein the second conductive filler is ferric chloride.

16. The electrophotographic member of claim 10, wherein the polyisocyanate comprises polycaprolactone ester toluene-diisocyanate.

17. The electrophotographic member of claim 10, wherein the polydiene comprises polybutadiene.

18. The electrophotographic member of claim 10, wherein the polyether polyol comprises polyether triol and polyether diol.

19. The electrophotographic member of claim 10, wherein the first conductive filler is cesium cobalt hexafluoroacetylacetonate and the second conductive filler is cobalt hexafluoroacetylacetonate.

20. The electrophotographic member of claim 19, wherein the polyether polyol comprises polyether triol and polyether diol.

21. The electrophotographic member of claim 19, wherein the polydiene comprises polybutadiene.

22. The electrophotographic member of claim 19, wherein the polyisocyanate comprises polycaprolactone ester toluene-diisocyanate.

23. An endless electrophotographic member comprising a body formed from a mixture of polycaprolactone ester toluene polyurethane, polybutadiene, cesium hexafluoroacetylacetonate and ferric chloride, which catalyzes oxidation of said polybutadiene, wherein said member has an outer surface of oxidized polybutadiene.

* * * * *